United States Patent

(12) United States Patent
    Grapsas

(10) Patent No.: US 11,027,323 B2
(45) Date of Patent: Jun. 8, 2021

(54) METHOD AND APPARATUS FOR AUTO-CALIBRATION OF A WIRE BENDING MACHINE

(71) Applicant: Automated Industrial Machinery, Inc., Tampa, FL (US)

(72) Inventor: Constantine Grapsas, Tampa, FL (US)

(73) Assignee: Advanced Orthodontic Solutions, Tampa, FL (US)

( * ) Notice: Subject to any disclaimer, the term of this patent is extended or adjusted under 35 U.S.C. 154(b) by 403 days.

(21) Appl. No.: 15/618,727

(22) Filed: Jun. 9, 2017

(65) Prior Publication Data
    US 2017/0355005 A1    Dec. 14, 2017

Related U.S. Application Data

(60) Provisional application No. 62/348,594, filed on Jun. 10, 2016.

(51) Int. Cl.
    *B21D 7/12*    (2006.01)
    *B21F 1/00*    (2006.01)
    *G05B 19/414*  (2006.01)

(52) U.S. Cl.
    CPC .............. *B21D 7/12* (2013.01); *B21F 1/006* (2013.01); *G05B 19/4145* (2013.01); *G05B 2219/33099* (2013.01)

(58) Field of Classification Search
    CPC .......... B21F 1/00; B21F 1/0006; B21F 7/024; B21F 7/14
    See application file for complete search history.

(56) References Cited

U.S. PATENT DOCUMENTS

| 4,522,113 A | 6/1985 | Tsuno |
| 5,447,432 A | 9/1995 | Andreiko |

(Continued)

FOREIGN PATENT DOCUMENTS

| EP | 0642854 A1 * | 3/1995 | ............... B21D 5/04 |
| EP | 1632298 | 3/2006 | |

(Continued)

OTHER PUBLICATIONS

Teledyne DALSA, Understanding Line Scan Camera Applications, 2014, www.teledynedalsa.com, p. 1, col. 1, para. 1-2; p. 1, col. 2, para. 2; figure on p. 1 (Year: 2014).*

(Continued)

*Primary Examiner* — Teresa M Ekiert
*Assistant Examiner* — Jared O Brown
(74) *Attorney, Agent, or Firm* — Fitch, Even, Tabin and Flannery LLP

(57) ABSTRACT

An apparatus and method for calibrating an automated wire bending machine is provided that includes a camera system comprising a camera and a lens configured with a focal plane fixedly positioned relative to a bending surface provided on the automated wire bending machine. The disclosed apparatus and method further includes a processor device configured to interpret images captured by the camera system. The apparatus and method measures an actual angle formed in a wire while a bent portion of the wire is substantially within the focal plane of the camera system, and a memory device stores values generated during a calibration sequence of the automated wire bending machine. The values correspond to the actual angle and a target angle provided for the calibrating of the automated wire bending machine.

9 Claims, 8 Drawing Sheets

(56) References Cited

U.S. PATENT DOCUMENTS

| | | | | |
|---|---|---|---|---|
| 5,461,893 | A * | 10/1995 | Tyler | B21D 5/042 72/10.1 |
| 5,479,683 | A * | 1/1996 | Flemmer | B21F 1/00 140/88 |
| 5,485,398 | A | 1/1996 | Yamazaki | |
| 5,652,395 | A | 7/1997 | Hirano | |
| 5,652,805 | A * | 7/1997 | Ooenoki | B21D 5/02 382/141 |
| 5,839,310 | A | 11/1998 | Tokai | |
| 5,875,664 | A | 3/1999 | Scott | |
| 5,966,974 | A * | 10/1999 | Song | B21D 7/12 72/17.3 |
| 6,026,668 | A | 2/2000 | Oda | |
| 6,612,143 | B1 | 9/2003 | Butscher | |
| 6,922,903 | B2 | 8/2005 | Horn | |
| 7,055,355 | B2 * | 6/2006 | Codatto | B21D 5/045 72/307 |
| 7,296,363 | B2 | 11/2007 | Danisch | |
| 7,584,637 | B2 | 9/2009 | Ghiran | |
| 8,266,940 | B2 | 9/2012 | Riemeier | |
| 8,631,674 | B2 * | 1/2014 | Christofilis | B21D 7/12 72/306 |
| 2010/0147048 | A1 | 6/2010 | Christofilis | |
| 2013/0291610 | A1 | 11/2013 | Nardetto | |
| 2014/0076015 | A1 | 3/2014 | Riemeier | |
| 2014/0154637 | A1 | 6/2014 | Hansen | |
| 2015/0135793 | A1 | 5/2015 | Plummer | |
| 2015/0320471 | A1 * | 11/2015 | Crawford | B21D 7/12 72/11.1 |
| 2015/0382446 | A1 | 12/2015 | Kwon | |
| 2016/0001039 | A1 | 1/2016 | Armour | |
| 2016/0114377 | A1 * | 4/2016 | Riemeier | B21F 1/008 29/896.11 |
| 2017/0312808 | A1 * | 11/2017 | Suto | B21F 1/00 |
| 2017/0360493 | A1 * | 12/2017 | Zucker | B21D 7/14 |

FOREIGN PATENT DOCUMENTS

| | | | | |
|---|---|---|---|---|
| EP | 1632298 | A1 * | 3/2006 | B21F 1/00 |
| EP | 1702727 | B1 * | 8/2008 | B21D 5/002 |
| EP | 1744165 | | 6/2015 | |
| EP | 3854782 | | 1/2020 | |
| WO | 9621529 | | 7/1996 | |
| WO | WO-9621529 | A1 * | 7/1996 | B21D 7/12 |
| WO | 2016054189 | | 4/2016 | |
| WO | WO-2016054189 | A1 * | 4/2016 | B21F 1/00 |

OTHER PUBLICATIONS

Wim Serruys, FMA Communications, "Adaptive Bending," http://www.thefabricator.com/article/bending/adaptive-bending, Nov. 15, 2001, pp. 1-5.
European Extended Search Report for Application No. 17175465.8 dated Oct. 25, 2017, pp. 1-7.

* cited by examiner

METHOD AND APPARATUS FOR AUTO-CALIBRATION OF A WIRE BENDING MACHINE

CROSS REFERENCE TO RELATED APPLICATIONS

This application claims the benefit of U.S. Provisional Application No. 62/348,594 filed Jun. 10, 2016.

TECHNICAL FIELD

The present invention relates to wire bending. More specifically, the invention relates generally to automated bending machinery, and methods for calibrating and operating such automated wire bending machinery.

BACKGROUND

Automated wire bending machines are used to create accurate and complex bends in a variety of materials, cross-sectional shapes, and sizes. Automated wire bending machines may be operated, for example, through computer numerical control (CNC). CNC wire bending machines allow a user to design a shape using a computer or other processing device create a part program, and create the shape consistently according to the program. Parts produced by an automated wire bending machine may be beyond the capabilities of ordinarily skilled human craftsmen. Because the wire-forming process is automated, complicated parts can be made beyond. Wire bending machines may be used to create precise parts repeatedly, reducing the need to inspect or rework individual parts. For instance, the creation of wire grocery carts requires many precise bends which are not easy to manually execute, let alone repeatedly.

Automated wire bending machines are typically used with a variety of different types of wire. Wire may be fed directly from coil stock to the wire bending machine or may be supplied in straight segments. The automated wire bending machines themselves may be designed to accommodate a variety of wire diameters. While the diameter of the wire used in such machines may vary within a range of values, in many instances no major tool changes are necessary to interchange different types of wire.

A variety of automated wire benders are known in the art. These include two-dimensional machines, in which the finished wire part is substantially flat because each bend forms the wire in a single plane; and three dimensional machines, in which the finished wire is more complex and may have bends defining multiple planes in space. For example, various embodiments of a three dimensional wire bending machine with multiple bending mandrels are disclosed in U.S. Pat. No. 8,631,674 to Christofilis et al., issued Jan. 14, 2014.

The wire bending machines known in the art generally include a wire feeding mechanism, a clamping mechanism, a bending mechanism, and a cutoff mechanism. The wire feeding mechanism feeds wire into the bending mechanism. Once the wire is in the correct position at the wire bending mechanism, the clamping mechanism secures the wire while the bending mechanism bends the wire. By repeating the steps of feeding the wire to a selected position and bending the wire to a selected angle, the wire bending machine creates an intricate series of bends in the wire. Three dimensional wire bending machines also include a means for rotating the wire relative to the bending mechanism, or alternatively, a means for rotating the bending mechanism relative to the wire. By rotating the wire or the bending mechanism, a three dimensional wire shape may be formed by changing the orientation of the wire relative to the bending mechanism at each bending location. This process is repeated until the wire has been bent into its final position. After the wire is bent into its final position, the cutoff mechanism cuts the wire.

In automated (e.g., CNC) wire bending machines, the wire feeding mechanism, clamping mechanism, means for rotating, bending mechanism, and cutoff mechanism are each driven by one or more actuators through a series of sequential operations defined in a part program. The actuators may be servo motors, stepper motors, hydraulic or pneumatic cylinders, or any other device that may be commanded electronically through circuits integrated with a computing device. Each actuator may further be associated with one or more feedback devices that provide position information associated with the respective actuator. These feedback devices might include encoders, resolvers, limit switches, proximity switches, or any other device that may provide position data electronically through circuits integrated with a computing device.

In automated wire bending machines as described above, a part program defines the shape of the wire part by providing bend angles and the length of wire between bend angles. The part program includes, for example, instructions defining a length of wire to feed through the machine, a bend angle with a bend radius, and the rotational angle of the bending head itself relative to the wire. Certain automated wire benders known in the art convert theses part files into a machine-specific file structure that defines the machine operations that will cause that machine to form the desired wire parts. The machine-specific file structure may include adjusted bend angles and adjusted rotation commands, defining the commanded bends and commanded orientation relative to the bending mechanism, based on calibration of the wire bender.

The adjusted bend angles and adjusted rotation commands accommodate a variety of physical variations in the wire or in the bending machine itself. For example, to form a particular angle in a wire, the wire must be bent farther than the desired bend angle. Persons skilled in the art describe this extra bending as "overbend." The phenomenon may also be described as "springback" because the wire springs back when a bending force is released. In view of this physical phenomenon, when defining bend angles for an automated wire bending machine, the machine must factor in a predetermined amount of overbend for each of the programmed bend angles. The amount of overbend may vary based on material properties, cross-sectional shape, diameter, bend angle, bend radius, and temperature. For example, the material properties of a steel wire may vary significantly enough from batch to batch to affect part quality. This is particularly true for wires manufactured from lower quality and recycled steel. Thus, the overbend values may shift from batch to batch of wire. Material properties are difficult to measure, requiring expensive equipment and trained operators. Manually calculating the overbend needed for each bend angle is therefore time-consuming and may not be accurate. Individually testing and programming each bend angle for a given part is similarly time-consuming and may be prohibitive when a machine runs short jobs for a large number of different parts.

For all of these reasons, an automated calibration sequence is desired to reduce labor costs and set-up time for each new batch of wire. Similarly, for rotation commands, the commanded rotation of the machine may need to be more than the rotation defined for a part. The amount of over rotation may vary based on the torsional stiffness of the wire material, the amount of friction between the wire and the machine, or the geometry of the machine's tooling.

SUMMARY

Generally speaking and pursuant to these various embodiments, an apparatus and method for calibrating an automated wire bending machine is provided herein. The disclosed embodiments provide a digital camera system mounted on an automated wire bending machine such that the digital camera captures an image of an angle formed in a wire by the automated wire bending machine. By processing the captured image, the camera system, or an associated computer, measures and stores the actual angle formed in the wire. By using the camera system to measure the angle, the embodiments more accurately measure the angle and require less time from a machine operator. The stored angle can then be used to calibrate the automated wire bending machine such that parts manufacturing using the automated wire bending machine are manufactured accurately. The disclosed embodiments provide means for calibrating an automated wire bending machine, requiring less setup time from machine operators. This allows the automated wire bending machine to efficiently compensate for sources of bending error, such as springback, or sources of rotational error, such as friction or variations in the stiffness of the wire.

In one described example, the method for calibrating an automated wire bending machine includes feeding a wire through an automated wire bending machine. The automated wire bending machine includes a bending die and at least one bending pin, such that a portion of the wire extends beyond the bending die and the at least one bending pin. The method further includes bending the wire to a target angle. Under the control of its programming, the automated wire bending machine uses the at least one bending pin by engaging the at least one bending pin against a side of the wire opposed to the bending die and driving the at least one bending pin against the wire to a predetermined position, thereby forming an angle in the wire.

The method further includes the automated wire bending machine disengaging the bending pin from the wire such that the bending pin no longer contacts the wire, and subsequently orienting the wire relative to the bending die. A camera system captures an image of a bent portion of the wire, and a processor measures an actual angle formed in the wire based at least in part on the image using a processor device associated with the camera system. An electronic memory stores a value based on the actual angle formed in the wire.

In some examples, the method further includes subsequently repeating the above steps to measure and store a plurality of values based on the measured actual angles. During manufacture of parts, the automated wire bending machine automatically adjusts one or more programmed bend angles associated with the manufactured wire part based on one or more of the values.

In some examples, the method further includes an orienting step. In a further described example, the orienting step further includes feeding wire from the automated wire bending machine such that the camera system captures an image of the bent portion of the wire, the angle formed in the wire, and a straight portion of the wire. In another further described example, the orienting step includes rotating the wire relative to the bending head. For example, the rotating includes either rotating the wire while the bending head remains stationary or rotating the bending head while the wire remains stationary.

In a further described example, the target angle selected for each repetition of the calibration steps differs from the target angle in prior repetitions. For example, the automated wire bending machine may need to generate values associated with several different target angles based, in one example, on the angles required by part programs loaded on the machine, or based, in a different example, on a range of motion of the wire bending machine.

In a further described example, the method further includes cutting the wire with a cut-off tool after the capturing step. After the wire has been cut off, the wire bending machine will be ready to form a new bend angle in subsequent repetitions of the calibration steps.

In a further described example, the one or more programmed bend angles is automatically adjusted by interpolating to calculate the one or more programmed bend angles based on two or more stored values associated with multiple pairs of the target angle and the actual angle. This allows the automated wire bending machine to infer the correct wire bend based on calibration values for target angles that are not quite the same as the programmed bend angles, which reduces the number of calibration steps that need to be performed by the wire bending machine. In further examples, the value stored in an electronic memory is based on the actual angle formed in the wire. This actual angle is associated in the electronic memory with the target angle. In further examples, the value stored may be the actual angle formed in the wire, or the value stored may be a calculated difference between the actual angle formed in the wire and the target angle.

In one described example, an automated wire bending machine includes a bending head comprising a bending surface, a bending die disposed on the bending surface, a servo-controlled bending mechanism rotatable around the bending die, a bending pin disposed on the bending mechanism, the bending pin configured to engage a wire disposed on the bending surface such that rotation of the bending mechanism forms an angle in the wire at the bending die. The automated wire bending machine further includes a wire channel aligned with the bending surface and the bending die, wherein the wire channel is configured to receive a wire and to align the wire on the bending surface and adjacent the bending die. The wire channel may simply be the expected wire path, which may be defined by components designed to feed the wire through the automated wire bending machine. The automated wire bending machine further includes a wire feeding mechanism configured to feed a wire through the wire channel.

In the described example, the wired bending machine further includes a camera system comprising a camera and a lens configured with a focal plane fixedly positioned relative to the bending surface. The automated wire bending machine includes a processor device configured to interpret images captured by the camera system to measure an actual angle formed in a wire while a bent portion of the wire is substantially within the focal plane of the camera system. The automated wire bending machine further includes a memory device configured for storing values corresponding to a plurality of actual angles individually corresponding to a plurality of target angles, wherein the values are collected during a calibration sequence of the automated wire bending machine. The processor device may be a component of the computer that controls the automated wire bending machine, or it may be a component of the camera, or it may be a component separate from these other devices.

In a further described example, the camera is positioned such that the focal plane of the lens is substantially parallel with the bending surface. In a preferred embodiment, the focal plane of the lens substantially coincides with the center line of the wire. Other configurations would also be viable to the extent that the image captured by the camera can be used to accurately measure the bend angle of the wire.

In a further described example, the bending head is disposed on a bending arm of the automated wire bending machine. The bending arm is configured to rotate around the wire channel such that the wire channel defines an axis of rotation for the bending head. In this example, the camera may be positioned such that the focal plane of the lens is rotated along the axis of rotation for the bending head. In this configuration, the focal plane of the lens forms a fixed angle relative to the bending surface. The machine compensates for the orientation of the camera by rotating the bending arm after the wire is formed, such that the bent wire is rotated into the focal plane of the camera.

In a further described example, the wire feeding mechanism provided on the automated wire bending machine further includes a wire clamp mechanism configured to clamp a wire and rotate the wire relative to the wire channel. In this example, the wire itself can be rotated, rather than rotating a bending arm or the camera system.

In one described example, an auto-calibration method is used for calibrating rotation angles on an automated wire bending machine. The method comprises feeding a wire through an automated wire bending machine comprising a bending head with a bending surface, at least one bending die, and at least one bending pin; such that a first wire portion extends beyond the at least one bending die and the at least one bending pin. The method further comprises bending the wire to a first target angle using the at least one bending pin by engaging one of the at least one bending pins against a side of the first wire portion opposed to one of the at least one bending dies, and driving the bending pin against the first wire portion to a predetermined position, thereby forming a first wire bend. The method further comprises disengaging the bending pin from the first wire portion such that the bending pin no longer contacts the wire and feeding the bent wire through the automated wire bending machine, such that a second portion of the wire extends beyond the at least one bending die and the at least one bending pin. The method further comprises orienting the at least one bending die relative to the wire at a predetermined rotation angle corresponding to a target rotation angle, such that a plane of the first wire bend is oriented at an angle relative to the bending surface. The method further comprises bending the wire to a second target angle using one of the at least one bending pins by engaging the bending pin against a side of the second wire portion opposed to one of the at least one bending dies and driving the bending pin against the second wire portion to a predetermined position, thereby forming a second bend in the wire. The method further comprises capturing an image of the first wire portion using a camera system, measuring an actual angle formed between the first wire portion and the wire based at least in part on the image using a processor device associated with the camera system. Lastly, the method comprises storing in an electronic memory a value based on the actual angle formed between the first wire portion and the wire and then automatically adjusting one or more programmed rotation angles associated with a manufactured wire part based on the value.

In a further described example, the method for calibrating rotation angles further comprises orienting the wire relative to the camera system. For example, the method includes feeding wire from the automated wire bending machine such that a third wire portion extends beyond the bending die and the at least one bending pin the camera system captures an image of the first wire portion and the third portion of the wire. In another example, the method includes rotating the wire relative to the bending head, by either rotating the wire while the bending head remains stationary or by rotating the bending head while the wire remains stationary.

In a further described example, the method for calibrating rotation angles further comprises repeating the calibration steps to measure and store a plurality of the value based on the actual angle. For example, the target rotation angle for each repeating of steps may differ from the prior target rotation angles. In a further example, the target rotation angle for each repeating of the calibration steps corresponds to a single one of the one or more programmed rotation angles and the predetermined rotation angle for each repeating of the steps differs from the predetermined rotation angle in prior repetitions of the steps.

In a further described example where multiple measured values are captured, the method for calibrating rotation angles further comprises automatically adjusting the one or more programmed rotation angles by interpolating to calculate the one or more programmed rotation angles based on two or more of the multiple pairs of the target rotation angle and the actual angle.

In a further described example the method for calibrating rotation angles the storing step further includes associating the value with the target rotation angle. In another example, the value is the actual angle formed in the wire. In yet another example, the value is a calculated difference between the actual angle formed in the wire and the target angle.

BRIEF DESCRIPTION OF THE DRAWINGS

The above needs are at least partially met through provision of a wire bending machine and calibration system described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
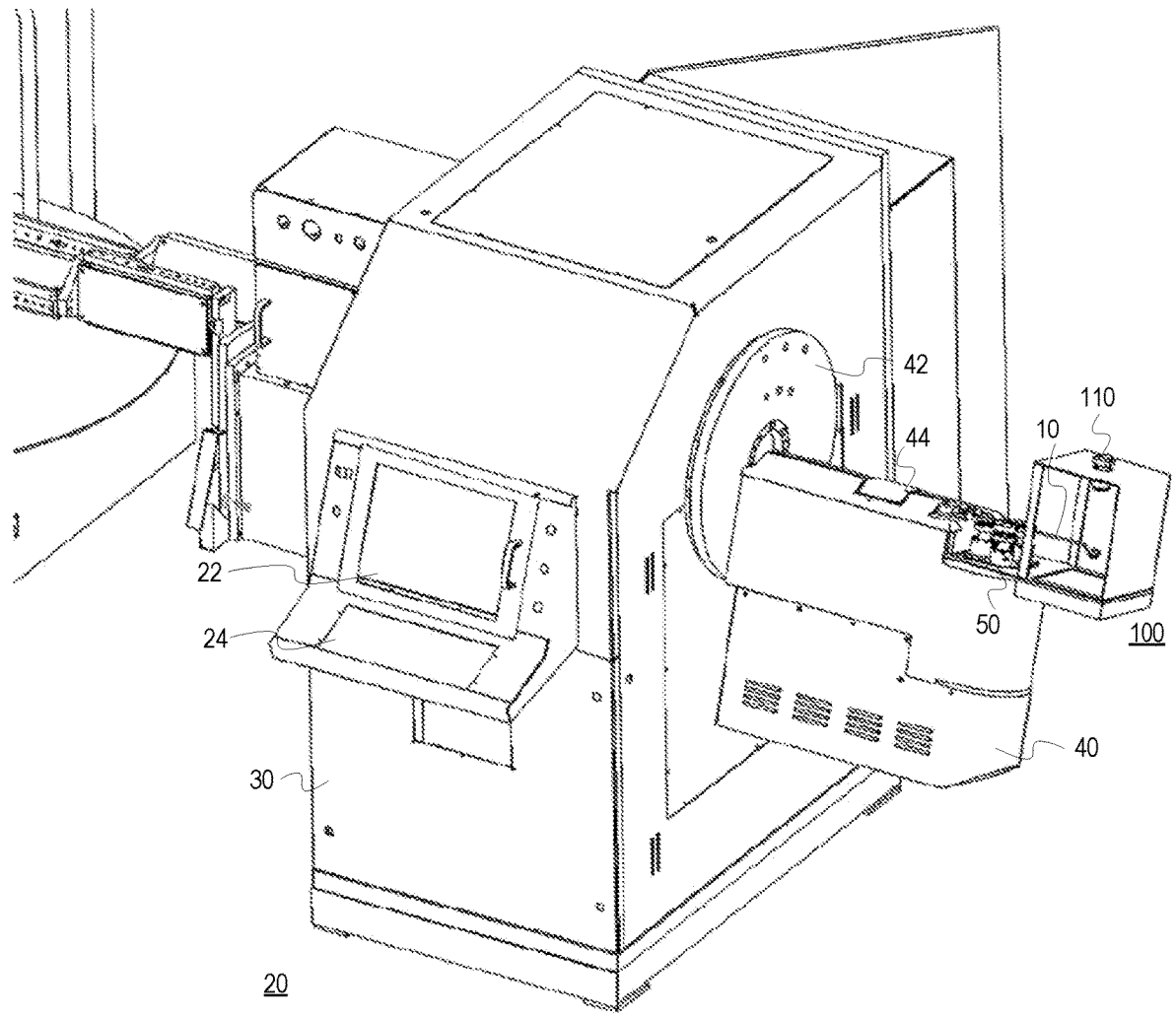
FIG. 1 comprises an isometric view of a wire bending machine fitted with a camera enclosure for automatic measurement of wire bend angles.

An embodiment of the invention is illustrated in FIGS. 1-5. In particular, FIG. 1 illustrates a three-dimensional wire bending machine 20, with a camera enclosure 100. As described further below, the camera enclosure 100 is preferably used during setup and configuration of the wire bending machine 20. The camera enclosure 100 includes a camera 110 configured to capture an image of the wire 10, the bend angle 12, and a wire portion 11 extending beyond the bend (illustrated in FIGS. 2, 4, 5, 7). Easy removal of the camera enclosure 100 protects the camera 110 and the camera enclosure 100 from damage during manufacturing operations. The camera enclosure 100 is therefore preferably mounted temporarily to the wire bending machine 20 such that the camera enclosure may be easily mounted and removed. Threaded fasteners, including slotted or socket head screws, thumb screws, and other easily removed fasteners may be used to secure the camera enclosure 100. Alternatively, mechanical structures designed to receive the camera enclosure 100 may be included on the wire bending machine 20. A person of ordinary skill in the art would recognize several known designs that would receive and secure the camera enclosure 100.

In general, the camera 110 provides a means for automatically calibrating the wire bending machine 20. The camera 110 captures one or more image of one or more bent wires, each bent wire having a different bend angle. Software analyzes the images to measure the actual angle of the bent wire. An auto-calibration routine stores calibration values such as the commanded angle and the corresponding actual angle, as described further below. Subsequently, the wire bending machine uses calibration values associated with each bend in a CNC wire bending program.

The wire bending machine 20 includes a bending head 50 located at the end of a bending arm 40. The bending head 50 includes tooling designed to bend a wire 10, as described below in detail. The bending arm 40 includes a wire feeding mechanism 44 that feeds the wire outwardly from the wire bending machine 20. By feeding the wire to predetermined locations, the wire bending machine 20 can bend the wire into pre-programmed shapes.

The entire bending arm 40 attaches to a mounting plate 42. The mounting plate 42 attaches to the base 30 of wire bending machine 20. When forming three-dimensional wire shapes, the bending arm 40 is rotated to different angles relative to the wire 10 prior to bending the wire 10. The wire 10 feeds outward from the mounting plate 42, perpendicular to the surface of the mounting plate. The mounting plate 42 is configured to rotate around the wire 10. Thus, the bending arm 40 includes an axis of rotation that coincides with the centerline of the wire 10.

The wire bending machine 20 includes a user interface 22 and one or more input device 24 such as a keyboard, mouse, touchpad, or other device as will be known to a person of ordinary skill in the art. The user interface 22 is preferably a personal computer running a Microsoft Windows® operating systems and a dedicated user interface software application. The user interface 22 communicates with other computing devices within the bending machine 20, including dedicated motion controllers that command the actuators that position the components of the bending machine 20 such as the bending arm 40 and the bending head 50.

The user interface 22 allows a technician to enter part parameters into the machine, which define wire parts. In addition, the user interface 22 allows a technician to enter calibration information so that the wire bending machine 20 can generate machine control instructions taking into account the calibration values. For example, machine-specific file structures as discussed above are generated by using calibration values to define the actual machine commands needed to manufacture the desired wire shapes. In this example, a wire bend may be defined as a 10 degree bend in the part program stored in the user interface 22. When the user interface 22 creates the machine-specific file structure, the 10 degree bend might be converted automatically to 11.5 degrees based on calibration data stored in the user interface 22.

The bending machine 20 is used to form three-dimensional wire shapes by rotating the bending arm 40 around the wire 10. In alternative embodiments, a three-dimensional wire shape may be formed by rotating the wire itself rather than the bending arm 40. These alternatives are preferably used for wire bending machines that receive straight wire segments instead of wire fed from a coil. In further alternative embodiments, the wire bending machine could be a two-dimensional wire bending machine, which lacks a bending arm or any other mechanism for rotating the bending head or the wire relative to each other.

The camera 110 is mounted such that the focal plane of the camera lens 115 (shown in FIG. 4) is parallel to the bending plane. As discussed further below, the bending plane is the plane in which all of the tooling on the bending head 50 operates on the wire 10. In alternative embodiments, a camera is mounted such that its focal plane is not parallel to the bending head on the wire bending machine. In an example, the camera is oriented so that it is facing the side of the bending tools. Thus, at the time a machine bends the wire, the camera's focal plane is oriented perpendicular to the plane of the produced bent wire form. After the wire is bent by the machine, the wire is rotated so that the plane created by the angle of the wire is parallel to the camera's imaging sensor.

Figure 2:
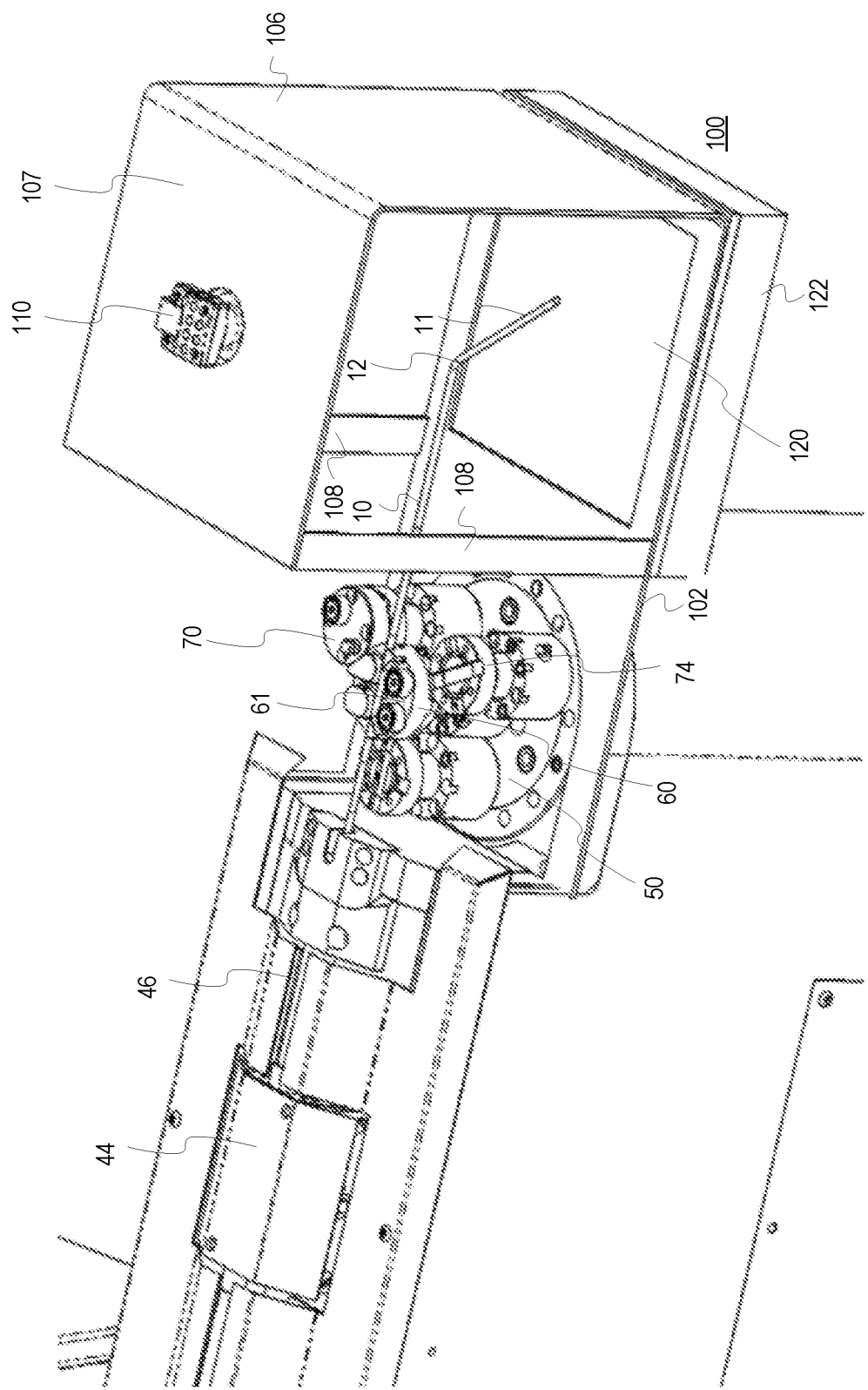
FIG. 2 comprises an isometric view of a bending head of a wire bending machine fitted with a camera enclosure for automatic measurement of wire bend angles.
Figure 3:
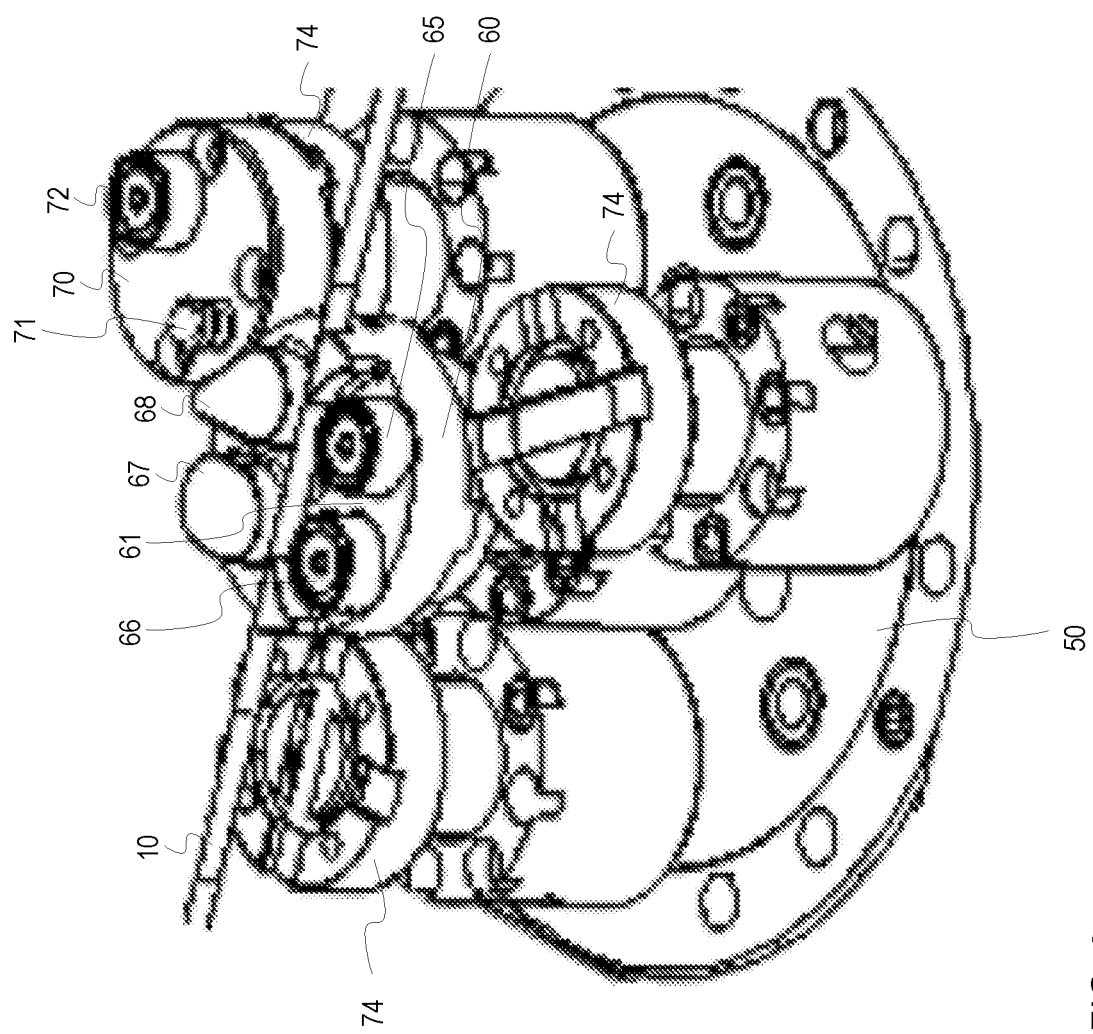
FIG. 3 comprises an isometric view of a bending head of a wire bending machine.

FIG. 2 illustrates the bending head 50 and the camera enclosure 100 in greater detail. The camera enclosure 100 may be formed from any rigid material, such as metal or high-strength plastic. The enclosure 100 is rigidly mounted to the wire bending machine. In the illustrated embodiment, the camera enclosure is formed from sheet metal to create a top 107, a back 106, and a baseplate 102. Enclosure supports 108 attach the top 107 to the baseplate 102. A diffuse backlight 120 or a white background provides a sharp high-contrast image of the wire to improve the accuracy of the measured wire angle. In the preferred embodiment, the baseplate 102 includes a cutout such that the backlight shines through the baseplate. A backlight enclosure 122 is mounted underneath the baseplate 102.

As discussed above, the bending arm 50 includes a wire feeding mechanism 44 that feeds the wire outwardly from the wire bending machine 20. The wire passes through a wire channel 46 before feeding out above the bending head 50. The bending head 50 includes a turret cluster 60 and a bending tool cluster 70. The turret cluster 60 includes a top surface 61 that supports the wire 10. In the illustrated embodiment, the bending head 50 also includes tool connectors 74 designed to receive a variety of bending tools. The features of the bending head are further illustrated in FIG. 3. In the illustrated embodiment, four tool pins 65, 66, 67, and 68 are disposed on the top surface 61 of the turret cluster 60. The wire 10 passes between the respective tool pins 65-68. The turret cluster 60 is retractable and rotates relative to the bending head 50. Turret cluster 60 rotates so that the wire can be fed through the center between any two adjacent pins (for example 65 and 68 are the two selected tool pins in the illustrated example). The selected tool pins act as a die against which a bend 12 can be formed in the wire 10. Turret cluster 60 has four possible orientations, each orientation being a 90-degree turn from the next. For example, in the illustrated example, the pairs of selected tool pins could be: 65 and 68, 65 and 66, 66 and 67, and 67 and 68. Thus, by rotating the turret cluster 60 to one of the four positions, different tool pins 65-68 are used to form bends in the wire 10. The tool pins 65-68 each have unique shape and diameter, making it possible to form different wire radii corresponding to the tool pin used to form a bend. In the illustrated example, tool pins 65 and 66 are circular. Tool pin 67 is oblong, and tool pin 68 is teardrop shaped such that it offers a different radius depending on the position of the turret cluster 60. Because each of the tool pins 65-68 is differently sized, the springback offset for bends formed on those pins will be different even if the bend angle itself is the same. Once in position, mandrel bending pins 71-72 bend the wire at an angle around one of the tool pins 65-68.

Mandrel bending pins 71 and 72 are disposed on the bending tool cluster 70. Like the turret cluster 60, the bending tool cluster 70 is retractable and rotates relative to the bending head 50. In addition, the entire bending head rotates around the turret cluster 60. When the bending tool cluster is advanced, one or more of the mandrel bending pins 71 and 72 may contact the wire and bend the wire around the selected tooling pin (e.g., 65-68). The bending tool cluster 70 is mounted on a tool connector 74. The illustrated bending head includes three tool connectors 74, which are each capable of receiving additional bending tool clusters to provide additional flexibility in the wire bending machine.

Figure 4:
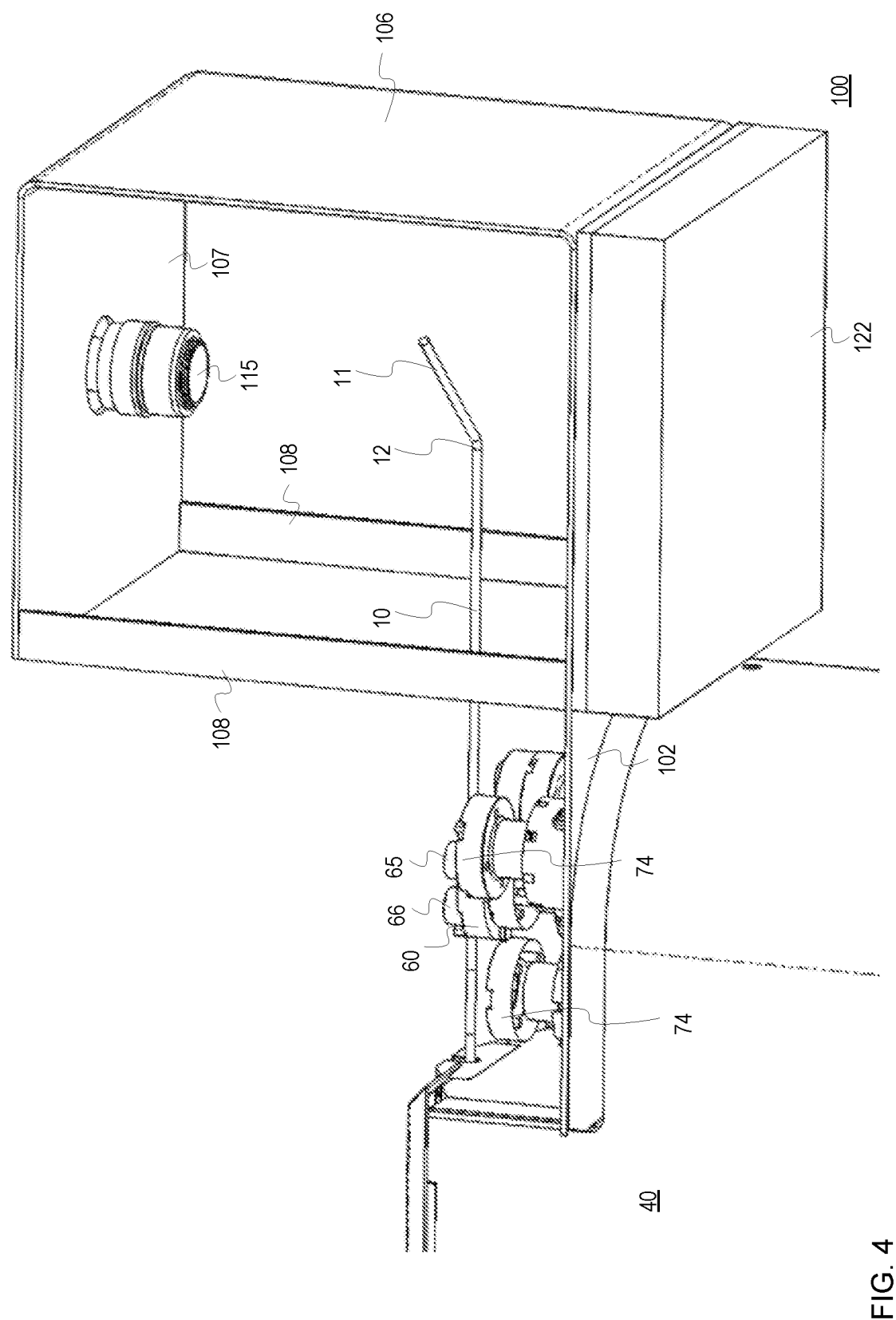
FIG. 4 comprises an isometric view of a bending head of a wire bending machine fitted with a camera enclosure for automatic measurement of wire bend angles.
Figure 5:
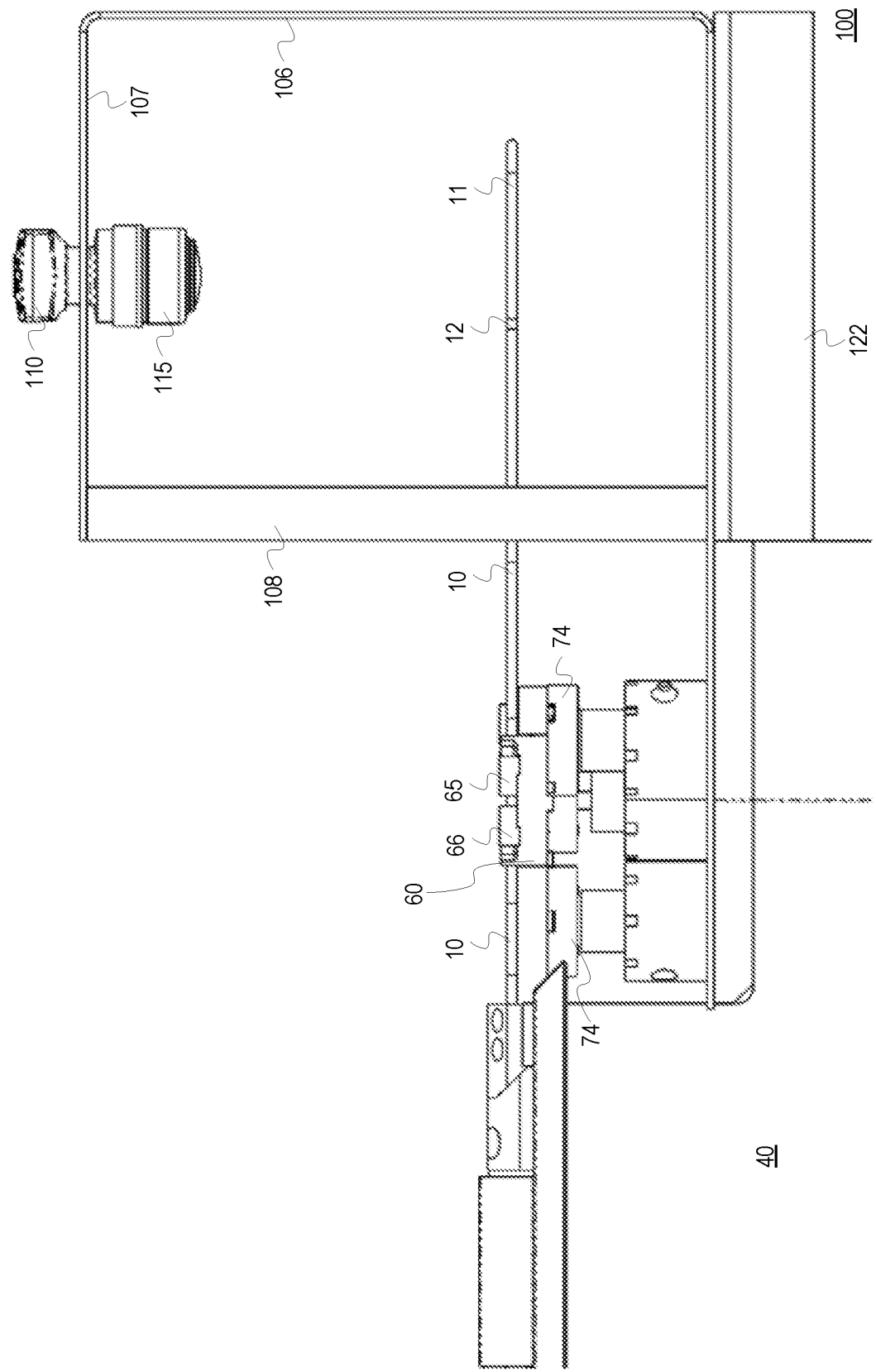
FIG. 5 comprises a side view of a bending head of a wire bending machine fitted with a camera enclosure for automatic measurement of wire bend angles.

FIG. 4 further illustrates the camera enclosure 100 mounted at the end of the bending arm 40. The camera enclosure includes a camera lens 115 attached to the camera 110. The camera lens 115 should minimize distortion across its field of view such that measurements of the wire bend angle are accurate and repeatable. In the preferred embodiment, the lens is telecentric, removing perspective errors that result from the position or distance or the wire relative to the lens. As illustrated, the wire 10 is fed into the camera enclosure 100 so that the angle of the bend 12 can be measured. FIG. 5 further illustrates the camera enclosure 100 mounted at the end of the bending arm 40. Persons having ordinary skill in the art will recognize that the positions of the camera 110, camera lens 115, and backlight 120 may be adjusted or changed to accommodate larger or smaller fields of view and depth of field for the camera 110. For this reason, the relative position of the camera 110, camera lens 115, and backlight 120 should not limit the scope of the invention. Similarly, the shape and configuration of the camera enclosure 100 should not limit the scope of the invention.

In alternative embodiments, the camera enclosure 100 may be separate from the wire bending machine itself. In these embodiments, a wire part is formed on the wire bending machine and placed in the camera enclosure 100 for inspection. The wire parts may be handled manually by a technician or automatically using a variety of known pick-and-place mechanisms such as articulated arms or gantry systems. In one implementation, the camera enclosure 100 may be mounted on a rolling cart such that the camera enclosure is portable for calibration of wire bending machines within a facility. In this embodiment, the camera enclosure is preferably connected to the operator interface 22 or other machine control system, or calibration values may be entered in the operator interface 22 manually by a technician.

Figure 6:
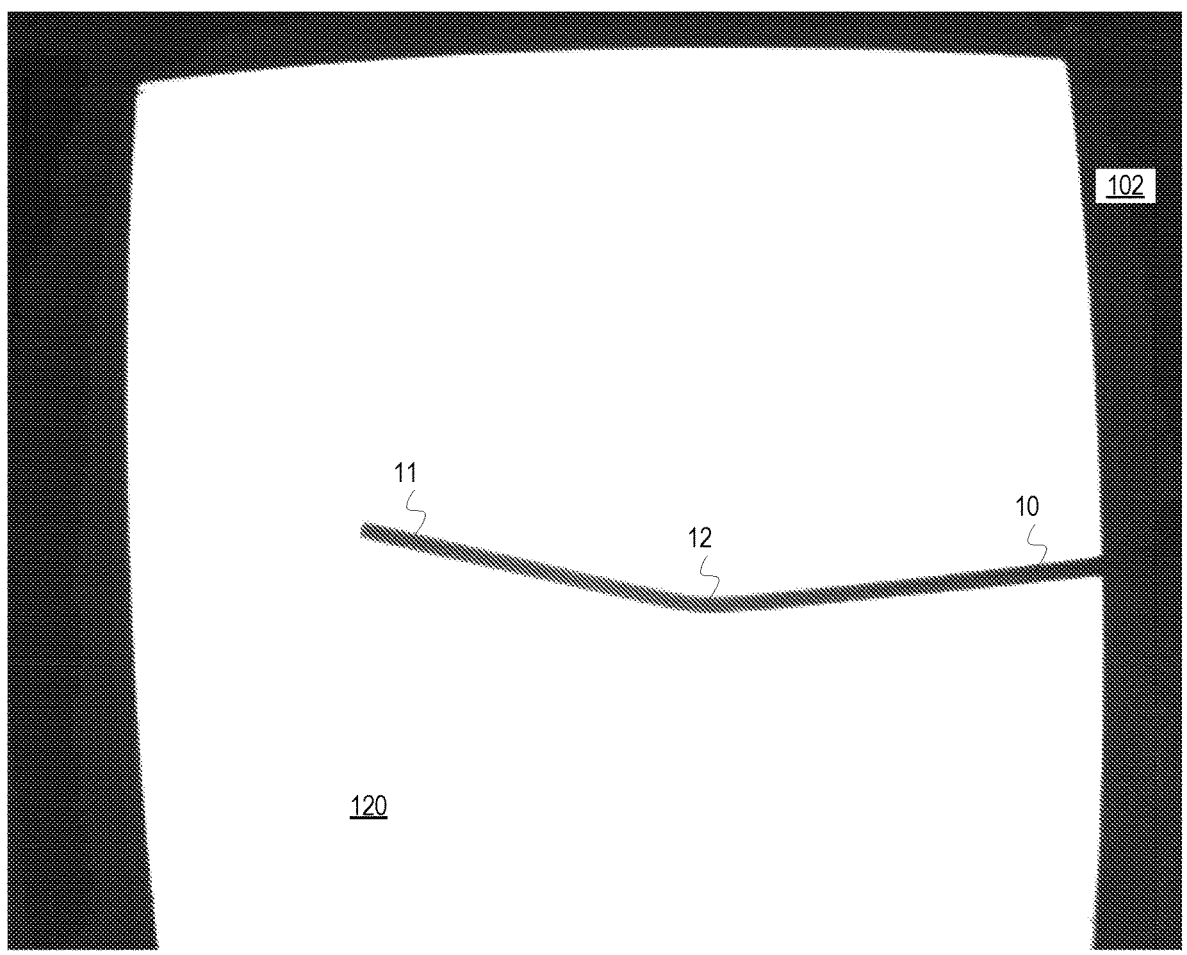
FIG. 6 comprises an image captured by a camera used for automatic calibration of a wire bending machine.

FIG. 6 is an image of the wire captured by the camera 110. As can be seen, the backlight 120 provides a bright white background against which the components of the wire are plainly visible; including the wire 10, bend 12, and bent portion 11—which is the end portion of the wire beyond the bend 12. The enclosure baseplate 102 is visible in the image as the dark frame surrounding the backlight portion 120. Because the image is high in contrast, it can be processed to measure the angle of the bend 12 using known edge detection and other image processing techniques. Other lighting arrangements may also provide the contrast necessary, including arrangements in which the wire components (wire 10, bent portion 11, and bend 12) are front-lit against a dark background.

Figure 7:
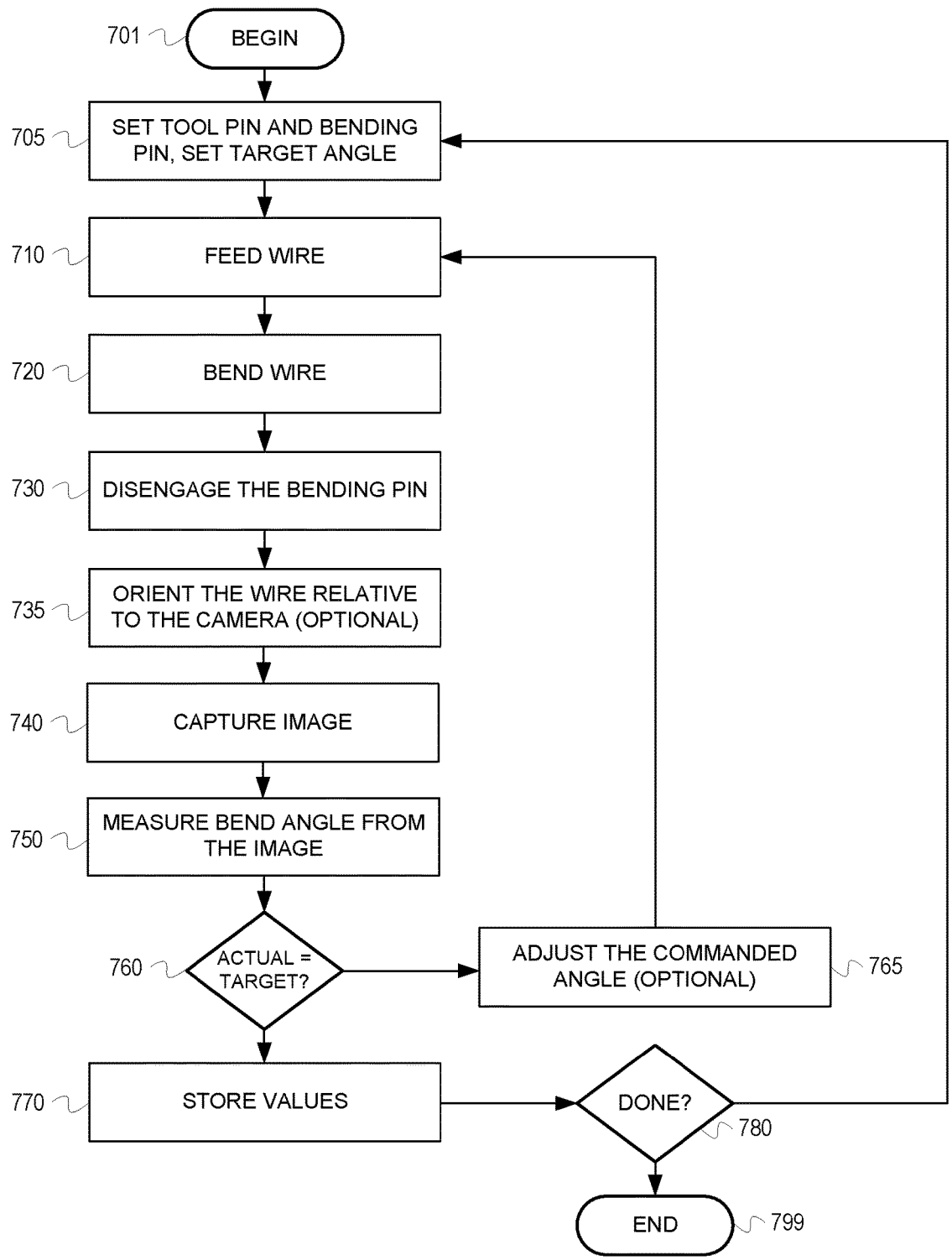
FIG. 7 comprises a flow-chart of steps associated with an automated bend angle calibration process for a wire bending machine.

A preferred method for calibrating bending angles on an automated wire bending machine is described as follows, with reference to FIG. 7. The calibration process begins at step 701. In the preferred embodiment, this occurs after the camera enclosure 100 has been mounted on the wire bending machine 20. As discussed above, it is preferable to remove the camera enclosure 100 except during machine calibration. As discussed above, however, in alternative embodiments the camera enclosure 100 is provided separate from the wire bending machine 20.

In step 705, a tool pin, bending pin, and target bend angle are selected for calibration. The target bend angle may be selected from a list of calibration angles, or it may be selected based on the angles in a particular part program. In one example, the list of calibration angles ranges from 5 degrees to 120 degrees, at 5 degree increments. In another example, machine operators may select one or more part program files that they expect to run during a given shift or during a given batch of wire. The machine controller automatically identifies the tooling used in that part file to create a list of bend angles needing calibration, along with tooling associated with each bend angle.

In another method, the list of calibration angles includes each angle from a selected part program, with calibration angles calculated by adding or subtracting an offset value from the program angles. For example, if a part program includes a 45-degree bend and a 60-degree bend, the list of calibration angles includes 40, 42.5, 45, 47.5, and 50 degree bends corresponding to the 45 degree angle; and 55, 57.5, 60, 62.5, and 65 degree bends corresponding to the 60 degree bend. In this way, the list of calibration angles allows the calibration method to efficiently and accurately calibrate for the selected part program.

Also in step 705, the wire bending machine selects a tool pin (e.g., any of 65-68) and a bending pin (e.g., 71 or 72) to use with the selected calibration angle. Servo motors associated with the bending head position the tool turret 60 and the bending tool cluster 70 appropriately so that they can be used to form angles in the wire. As discussed above, the tool pin and bending pin are preferably selected to correspond with tooling combinations specified in one or more part program files stored on the machine controller. In another example, the tool pin and bending pin are selected as part of a sequence that provides calibration of each possible combination that could be used by the wire bending machine.

In step 710, the wire bending machine 20 feeds wire automatically from a coil or other source of raw wire. The wire 10 is advanced past the bending die (e.g., any of 65-68) and at least one mandrel bending pin (e.g., 71 or 72) so that the wire 10 is in position to be bent by the bending head 50. The length of the wire may depend upon the desired accuracy of the calibration sequence. A longer wire typically provides more accurate measurement of the angle applied to the wire, because the displacement of the wire will be larger at greater distances from the bend location.

In step 720, the wire is bent by the automated wire bending machine to a commanded angle. The commanded angle may be equivalent to the target angle selected in step 705, or it may differ based on prior calibration data. The at least one mandrel bending pin (e.g., 71 or 72) engages a side of the wire 10 opposite the selected tool pin (e.g., any of 65-68), and drives the at least one bending pin (e.g., 71 or 72) against the wire to a predetermined position corresponding to the commanded angle, thereby forming an angle in the wire.

In step 730 the wire bending machine 20 disengages the bending pin (e.g., 71 or 72) from the wire 10 such that the bending pin no longer contacts the wire. This step will typically require moving the bending tool cluster 70 some distance sufficient to allow the wire to spring back into its relaxed position. Preferably, the bending tool cluster 70 is moved back to the position it occupied before bending the wire, making it ready when the next angle needs to be formed.

In optional step 735, the wire 10 is oriented relative to the camera enclosure 100. For example, the wire 10 may be fed such that it projects beyond the bending head 50 and into the camera enclosure 100, as illustrated in FIGS. 2, 4, and 5. Step 635 is also necessary if the wire is bent in a plane that differs from the focal plane of the camera system. For example, if the camera 110 is mounted perpendicular to the bending head 50, the bending arm 40 would need to be rotated 90 degrees to bring the bent wire into view for the camera 110. In alternative embodiments of the wire bending machine, the wire itself may be rotated and the camera enclosure may be stationary.

In the alternative embodiments in which the camera enclosure 100 is provided separate from the wire bending machine 20 (e.g., in a portable cabinet as described above), optional step 735 is the step where the wire bending machine cuts off the bent wire, and the wire part is moved into the camera enclosure 100 either manually or automatically.

In step 740, the camera 110 captures an image of the bent portion of the wire 10. In one embodiment, the camera itself stores a digital representation of the image (for example a bitmap or other digital representation of the image) in its own memory such that a processor within the camera can perform image processing operations in subsequent steps. In alternative embodiments, the camera sends a digital representation of the image to a separate processing unit.

In the preferred embodiment, the wire bending machine cuts off the bent wire at any time after step 740 and before step 770 or the next iteration of step 710 if the process loops back. In some examples, the wire is first retracted to a position as close as possible to the bend 12 formed in the wire. This minimizes waste during the calibration sequence.

In step 750, the actual angle formed in the wire is measured based on the image. A processor performs image processing operations using known tools, either in the camera itself or in a separate processing unit as described above.

In step 770, the machine control system stores the commanded angle and the actual angle in a file or database structure. In alternative embodiments, the machine control system stores the target angle and an offset value used to generate the commanded angle. The stored values may be stored in any type of file or database structure, so long as the information may be retrieved at a later time. In various examples, the stored values are associated with record identifiers or in a sequence such that the stored values are identified from the associated record identifiers or inferred from the sequence. Persons having ordinary skill in the art will recognize numerous methods for storing information sufficient to make it possible for a bending machine to associate the commanded angle with the programmed angle.

In optional step 760, the machine control system assesses whether the measured actual angle is substantially equal to the target angle. In one example, a tolerance value is used to determine whether the measured angle is close enough that further calibration is no longer necessary. If the measured angle is within the tolerance, the system moves on to step 770 and stores the commanded angle and the target angle.

In an alternative embodiment, the commanded angle is adjusted to reflect any remaining error in the measured angle relative to the target angle using the calculation methods discussed below. If, at optional step 760, the measured angle is found to be outside of the tolerance, the system moves to step 765 and recalculates the commanded angle based on the relative difference between the measured actual angle and the commanded angle. For example, the New Commanded Angle=Old Commanded Angle+(Old Commanded Angle−Measured Angle). Other formulas may be applied to arrive at a new value for the commanded angle. After recalculating the commanded angle at step 765, the method returns to step 710 and begins the process of forming a new bend in a new piece of wire.

In step 780, system evaluates whether more bend angles need to be formed and measured. For each additional angle, the system repeats steps 710 through 770 to measure and store a plurality of actual bend angle values. In this way, the machine repeats the calibration steps until all bend angle measurements are taken. After the last bend angle has been calibrated, the calibration sequence ends at step 799. Thus, the calibration steps are performed separate from the manufacture of programmed parts. Generally, a programmed part will include multiple bend angles and those programmed bend angles may differ from the calibration angles. In a preferred embodiment each repetition of the calibration sequence is completed before the automated wire bending machine manufactures wire parts. Thus, the wire bending machine uses the stored calibration values to automatically adjust one or more programmed bend angles associated with a manufactured wire part based on one or more of the multiple pairs of the target angle and the associated actual angle.

Based on the stored calibration values CNC wire bender calculates commanded angles that can be used when it makes parts. In a preferred embodiment the commanded angles are stored and used directly because the actual angles correspond to the bend angles in the part program file. In alternative embodiments, the commanded angles corresponding to the bend angles in the part program files are calibrated indirectly. For example, if the actual angle observed during calibration is 41 degrees on a commanded angle of 40 degrees, the commanded angle for a part program that requires a 42-degree bend will be interpolated from actual angles stored for the calibrated 40 and neighboring 45-degree angles. Other methods of indirectly calculating the commanded angle will be recognized by persons having ordinary skill in the art.

Figure 8:
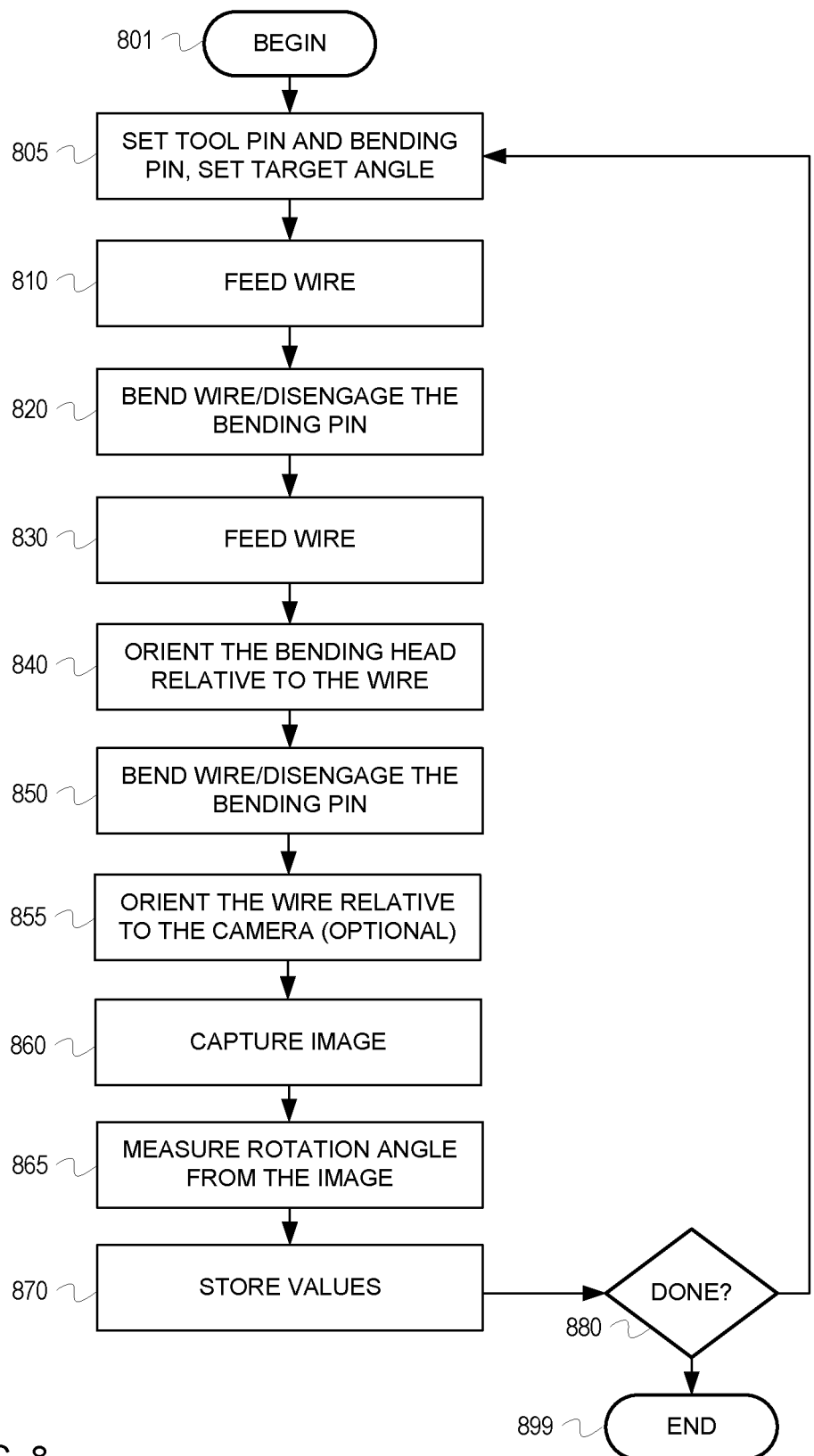
FIG. 8 compromises a flow-chart of steps associated with an automated rotation angle calibration for a wire bending machine.

A preferred method for calibrating rotation angle on an automated wire bending machine is described as follows, with reference to FIG. 8. The calibration process begins at step 801. The calibration method described in FIG. 8 is preferably performed after the bend angle calibration is complete, because the calibration process relies in part on generating known bend angles so that the orientation of the wire relative to the bending head 50 may be measured and calibrated.

In step 805, a tool pin, bending pin, and target rotation angle is selected for calibration. As with the bend angle calibration, the target rotation angle may be selected from a list of rotation angles, or it may be selected based on the rotation angles in a particular part program. In one example, the list of rotation angles ranges from five degrees to 120-degrees, at five degree increments. In other examples, the target rotation angle may be selected from a selected part program file, or derived from the angles in a part program file, as discussed above with respect to the bend angle calibration.

Also in step 805, the wire bending machine selects a tool pin (e.g., any of 65-68) and a bending pin (e.g., 71 or 72) to use with the selected calibration angle. Servo motors associated with the bending head position the tool turret 60 and the bending tool cluster 70 appropriately so that they can be used to form angles in the wire. As with the bend angle calibration, the tool pin and bending pin may be selected to correspond with tooling combinations specified in one or more part program files or as part of a sequence that provides calibration of each possible combination that could be used by the wire bending machine.

Step 810 corresponds to the wire feeding in step 710 of the bend angle calibration sequence. Similarly, step 820 corresponds to the wire bending step 720 in the bend angle calibration sequence. For purposes of the rotation angle calibration, however, the bend angle is preferably 90 degrees. Step 820 also incorporates the step of disengaging the bending pin, as discussed above with respect to step 730 of the bend angle calibration sequence.

In step 830, the wire bending machine feeds a length of wire, as described with respect to step 710 of the bend angle calibration sequence. For purposes of step 830 of the rotation angle calibration, however, the amount of wire fed is preferably the minimum amount of wire sufficient for the bent portion of the wire to clear the bending pins and to provide enough length so the bending pins to form a second bend on the wire.

In step 840, the wire bending machine 20 orients the bending head relative to the wire, meaning that the bending arm 40 is commanded to rotate to an angle corresponding to the target rotation angle selected in step 805. The commanded rotation angle may be equivalent to the target rotation angle selected in step 805, or it may differ based on power calibration data. In alternative embodiments of the wire bending machine, the wire itself may be rotated and the bending head 50 may be stationary.

In step 850, the wire is bent again as described in the wire bending step 720 in the bend angle calibration sequence. As with step 820, the bend angle is preferably 90 degrees. By forming two 90 degree bends, the rotation angle will be easily aligned with respect to the focal plane of the camera 110.

In optional step 855, the wire 10 is oriented relative to the camera enclosure 100. For example, the wire 10 may be fed such that it projects beyond the bending head 50 and into the camera enclosure 100, as illustrated in FIGS. 2, 4, and 5. Step 855 is also necessary to align the focal plane of the camera 110 so that it may capture an image of the wire portion 11 formed in front of the bend from step 820. For example, if the camera 110 is mounted as shown in FIGS. 1, 2, 4, and 5, then the bending arm 40 will need to be rotated by 90 degrees to place the wire portion 11 into view for the camera 110. In alternative embodiments of the wire bending machine, the wire itself may be rotated and the camera enclosure may be stationary.

As with the bend angle calibration, alternative embodiments of the rotation angle calibration use a separate camera enclosure 100. In these embodiments, step 855 is the step where the wire bending machine cuts off the bent wire, and the wire part is moved into the camera enclosure 100 either manually or automatically.

In step 860, the camera 110 captures an image of the wire portion 11 created by the first bending step 820, as described above with respect to the bend angle calibration.

In the preferred embodiment, the wire bending machine cuts off the bent wire at any time after step 860 and before step 899 or the next iteration of step 805 if the process loops back. In some examples, the wire is first retracted to a position as close as possible to the bend 12 formed in the wire. This minimizes waste during the calibration sequence.

In step 865, the actual rotation angle formed in the wire is measured based on the image. A processor performs image processing operations using known tools, either in the camera itself or in a separate processing unit as described above.

In step 870, the machine control system stores the commanded rotation angle and the actual angle in a file or database structure. In alternative embodiments, the machine control system stores the target angle and an offset value used to generate the actual angle. These calibration values may be stored in any type of file or database structure, so long as the information may be retrieved at a later time. In various examples, the calibration values are associated with record identifiers or in a sequence such that the stored values are identified from the associated record identifiers or inferred from the sequence. Persons having ordinary skill in the art will recognize numerous methods for storing information sufficient to make it possible for a bending machine to associate the commanded angle with the programmed angle.

As with the bend angle calibration, an optional step may be included in the rotation angle calibration sequence, in which the machine control system assesses whether the measured actual angle is substantially equal to the target angle. This optional step is not shown in FIG. 8, but would occur between steps 865 and 870 in exactly the same fashion as described for steps 760 and 765, causing the sequence to loop back to step 810 after the commanded rotation angle has been adjusted.

In step 880, the machine control system evaluates whether more rotation angles need to be formed and measured. For each additional rotation angle, the system repeats steps 806 through 870 to measure and store a plurality of actual rotation angle values. In this way, the machine repeats the calibration steps until all calibration angle measurements are taken. After the last rotation angle has been calibrated, the calibration sequence ends at step 799. Rotation angle calibration values may be applied differently when the wire bending machine 20 is used to manufacture parts as compared to the bend angle calibration values. The machine errors in the rotation axis are caused by different physical phenomena. For example, the errors in the rotation axis may cause relatively constant error across a wide range of rotation angles. In one example of such an error, friction between the wire channel and the wire 10 may cause the wire 10 to twist by a constant amount whenever the bending arm 40 is rotated. Errors caused by this physical phenomena are likely to be constant beyond a certain amount of rotation. In general, however, the stored calibration values may be used in parts manufacturing in the same fashion as the bend angle calibration values discussed above.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for calibrating a rotation angle of an automated wire bending machine, the method comprising:
    a) feeding a wire through an automated wire bending machine comprising a bending head comprising a bending surface, at least one bending die, and at least one bending pin; such that a first wire portion extends beyond the at least one bending die and the at least one bending pin;
    b) bending the wire to a first target angle using the at least one bending pin by engaging one of the at least one bending pins against a side of the first wire portion opposed to one of the at least one bending dies, and driving the bending pin against the first wire portion to a predetermined position, thereby forming a first wire bend;
    c) disengaging the bending pin from the first wire portion such that the bending pin no longer contacts the wire;
    d) feeding the wire through the automated wire bending machine, such that a second portion of the wire extends beyond the at least one bending die and the at least one bending pin;
    e) orienting the at least one bending die relative to the wire at a rotation angle corresponding to a target rotation angle, such that a plane of the first wire bend is oriented at an angle relative to the bending surface;
    f) bending the wire to a second target angle using one of the at least one bending pins by engaging the bending pin against a side of the second wire portion opposed to one of the at least one bending dies and driving the bending pin against the second wire portion to a predetermined position, thereby forming a second bend in the wire;
    g) capturing an image of the first wire portion using a camera system;
    h) measuring an actual angle formed between the first wire portion and the wire based at least in part on the image using a processor device associated with the camera system;
    i) storing in an electronic memory a value based on the actual angle formed between the first wire portion and the wire;
    j) automatically adjusting one or more programmed rotation angles associated with a manufactured wire part based on the value.

2. The method for calibrating a rotation angle of an automated wire bending machine of claim 1, further comprising repeating steps a) through i) to measure and store a plurality of the value based on the actual angle.

3. The method for calibrating a rotation angle of an automated wire bending machine of claim 2, wherein the target rotation angle for each repeating of steps a) through i) differs from the target rotation angle in prior repetitions of steps a) through i).

4. The method for calibrating a rotation angle of an automated wire bending machine of claim 2, wherein the target rotation angle for each repeating of steps a) through i) corresponds to a single one of the one or more programmed rotation angles and wherein the predetermined rotation angle for each repeating of steps a) through i) differs from predetermined rotation angle in prior repetitions of steps a) through i).

5. The method for calibrating a rotation angle of an automated wire bending machine of claim 1 further comprising cutting a portion of the wire after the capturing an image in step g) such that the bent portion and at least one of the first bend or the second bend are removed.

6. An automated wire bending machine comprising:
    a bending head comprising a bending surface, a bending die disposed on the bending surface, a servo-controlled bending mechanism rotatable around the bending die, a bending pin disposed on the bending mechanism, the bending pin configured to engage a wire disposed on the bending surface such that rotation of the bending mechanism forms an angle in the wire at the bending die;
    a wire channel aligned with the bending surface and the bending die, wherein the wire channel is configured to receive a wire and to align the wire on the bending surface and adjacent the bending die;
    a wire feeding mechanism configured to feed a wire through the wire channel;
    a camera system comprising a camera and a lens configured with a focal plane fixedly positioned relative to the bending surface such that the focal plane of the lens is substantially parallel with the bending surface;
    a processor device communicably coupled to the camera system, the processor device configured to interpret images captured by the camera system to measure an actual angle formed in a wire while a bent portion of the wire, the actual angle in the wire, and at least part of a straight wire portion fed from the wire feeding mechanism are substantially within the focal plane of the camera system;
    a memory device communicably coupled to the processor device, the memory device configured for storing a calibration value corresponding to the actual angle corresponding to a target angle, wherein the calibration value is collected during a calibration sequence of the automated wire bending machine;
    wherein the processor device is further configured to automatically adjust one or more programmed bend angles associated with a wire part based on the stored calibration value.

7. The automated wire bending machine of claim 6, wherein the bending head is disposed on a bending arm rotatable around the wire channel such that the wire channel defines an axis of rotation for the bending head.

8. The automated wire bending machine of claim 6,
    wherein the bending head is disposed on a bending arm; and
    wherein the camera system is fixedly mounted on the bending arm.

9. An automated wire bending machine comprising:

a bending head comprising a bending surface, a bending die disposed on the bending surface, a servo-controlled bending mechanism rotatable around the bending die, a bending pin disposed on the bending mechanism, the bending pin configured to engage a wire disposed on the bending surface such that rotation of the bending mechanism forms an angle in the wire at the bending die;

a wire channel aligned with the bending surface and the bending die, wherein the wire channel is configured to receive a wire and to align the wire on the bending surface and adjacent the bending die;

a wire feeding mechanism configured to feed a wire through the wire channel;

a camera system comprising a camera and a lens configured with a focal plane fixedly positioned relative to the bending surface such that the focal plane of the lens is not substantially parallel to the bending surface;

a processor device communicably coupled to the camera system, the processor device configured to interpret images captured by the camera system to measure an actual angle formed in a wire while a bent portion of the wire, the actual angle in the wire, and at least part of a straight wire portion fed from the wire feeding mechanism are substantially within the focal plane of the camera system;

a memory device communicably coupled to the processor device, the memory device configured for storing a calibration value corresponding to the actual angle corresponding to a target angle, wherein the calibration value is collected during a calibration sequence of the automated wire bending machine;

wherein the processor device is further configured to automatically adjust one or more programmed bend angles associated with a wire part based on the stored calibration value.

* * * * *